United States Patent [19]

Williams

[11] 4,405,162
[45] Sep. 20, 1983

[54] LARGE-DIAMETER MULTI-PASSAGE SWIVEL JOINT FOR HIGH PRESSURE SERVICE

[75] Inventor: Michael R. Williams, Houston, Tex.

[73] Assignee: FMC Corporation, Chicago, Ill.

[21] Appl. No.: 240,725

[22] Filed: Mar. 5, 1981

[51] Int. Cl.³ ............................................. F16L 39/04
[52] U.S. Cl. ..................................... 285/95; 285/136; 285/190
[58] Field of Search .......................... 285/136, 190, 95

[56] References Cited

U.S. PATENT DOCUMENTS

| | | | |
|---|---|---|---|
| 3,698,433 | 10/1972 | Dobler et al. | 285/136 X |
| 4,052,090 | 10/1977 | Stafford | 285/136 X |
| 4,126,336 | 11/1978 | Ortloff et al. | 285/136 |
| 4,306,741 | 12/1981 | Foolen | 285/136 |

FOREIGN PATENT DOCUMENTS

| | | | |
|---|---|---|---|
| 2914066 | 10/1979 | Fed. Rep. of Germany | 285/136 |
| 602739 | 4/1978 | U.S.S.R. | 285/136 |

Primary Examiner—Thomas F. Callaghan
Attorney, Agent, or Firm—L. B. Guernsey; W. W. Ritt, Jr.; R. B. Megley

[57] ABSTRACT

A pipe swivel joint for simultaneous transfer of a plurality of separate fluids between a plurality of inlet conduits and a plurality of corresponding outlet conduits comprises a plurality of stacked sections or stages of staggered diameter which are readily removable for repair and service. Each of the removable stages includes an annular inner element having a radially extending inlet port therethrough, an annular outer element rotatably surrounding the inner element and one or more seal plates connected to the axial ends of the inner element. An annular fluid flow passage for each section is defined by the outer surface of the inner element, the inner surface of the outer element and the surface of the connected seal plates. Each of the fluid flow passages is connected to an outlet conduit by a radial outlet port through the outer member and the fluid flow passage is connected to an inlet conduit by the inlet port through the inner member.

15 Claims, 7 Drawing Figures

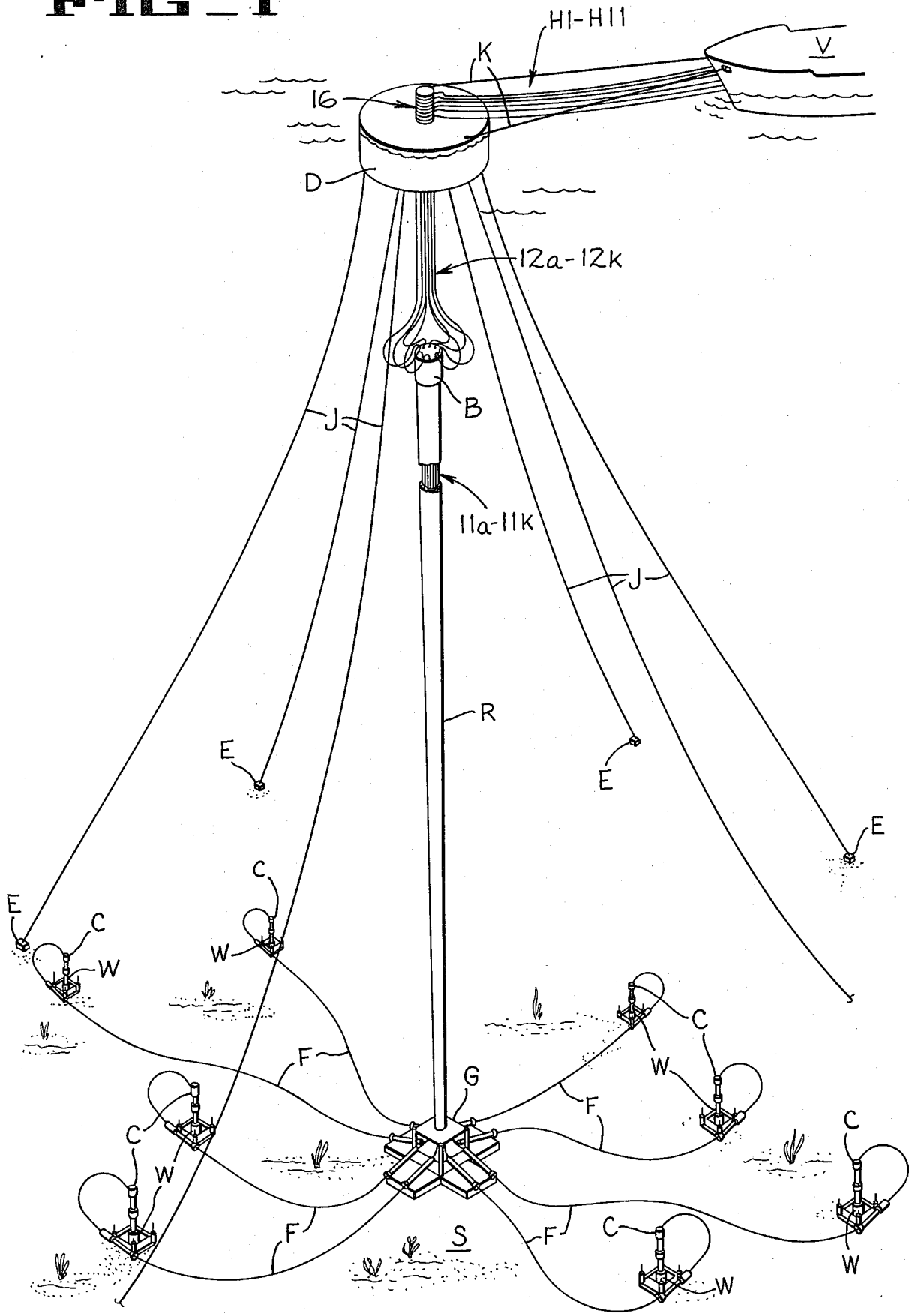
FIG_1

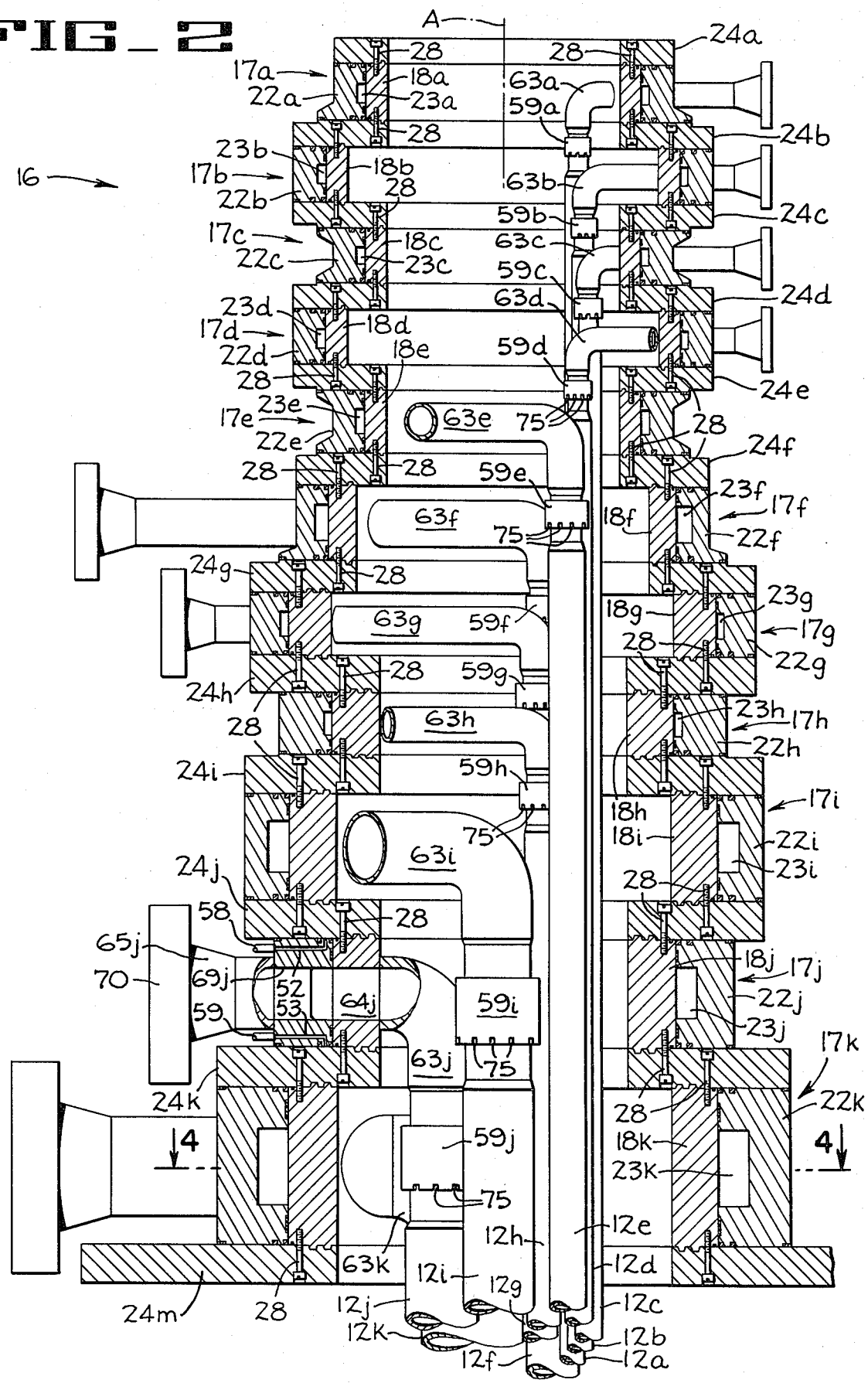

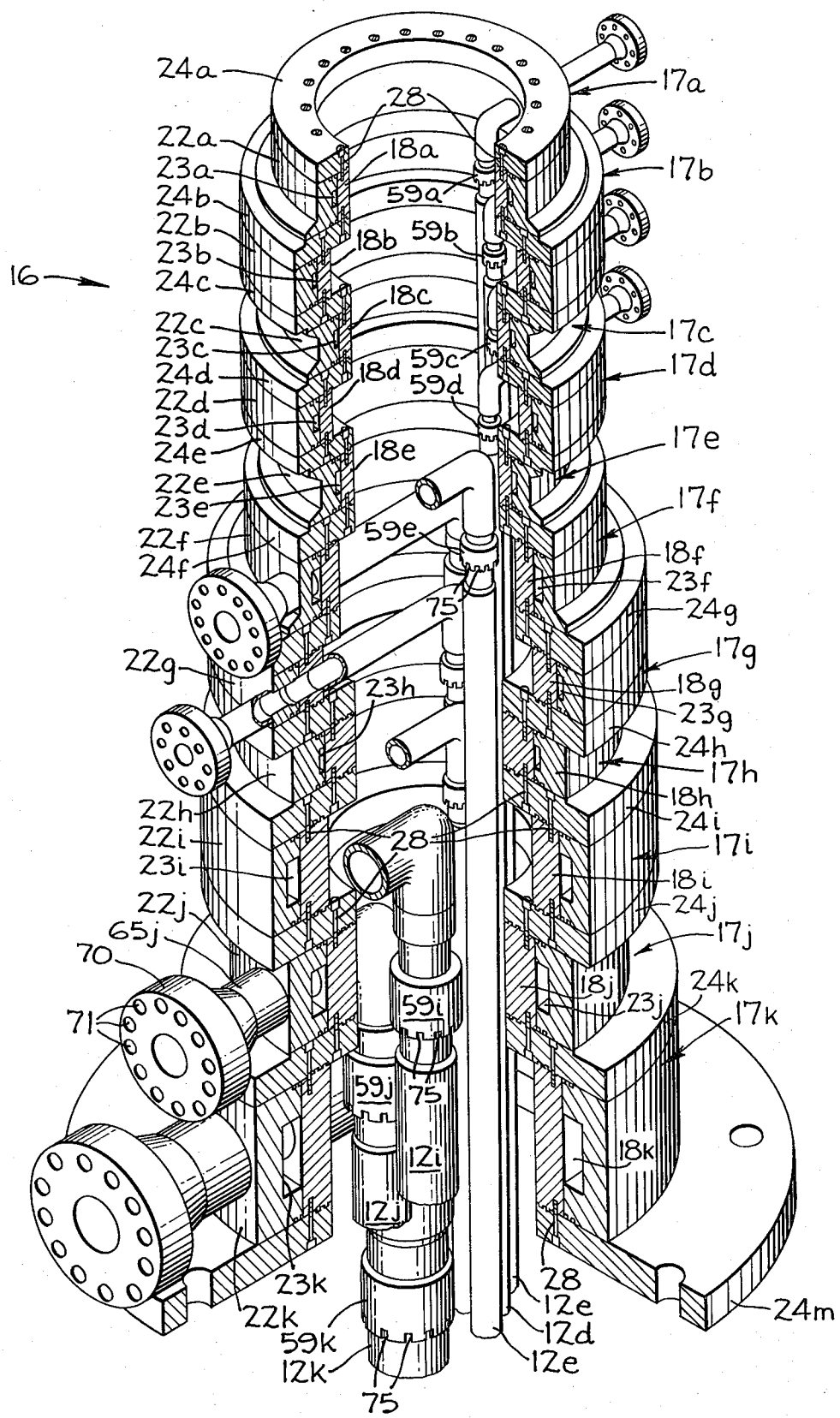

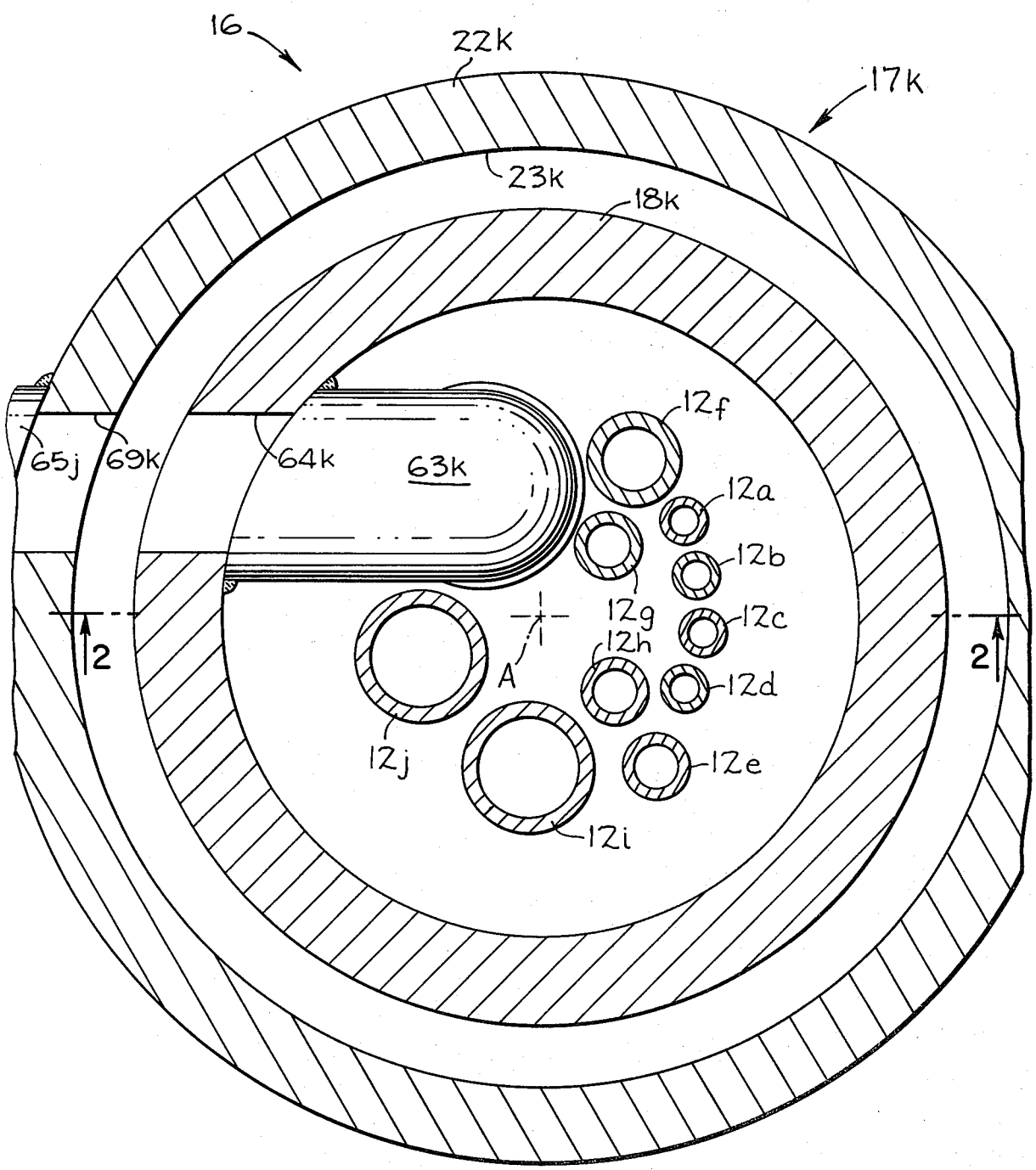
FIG_4

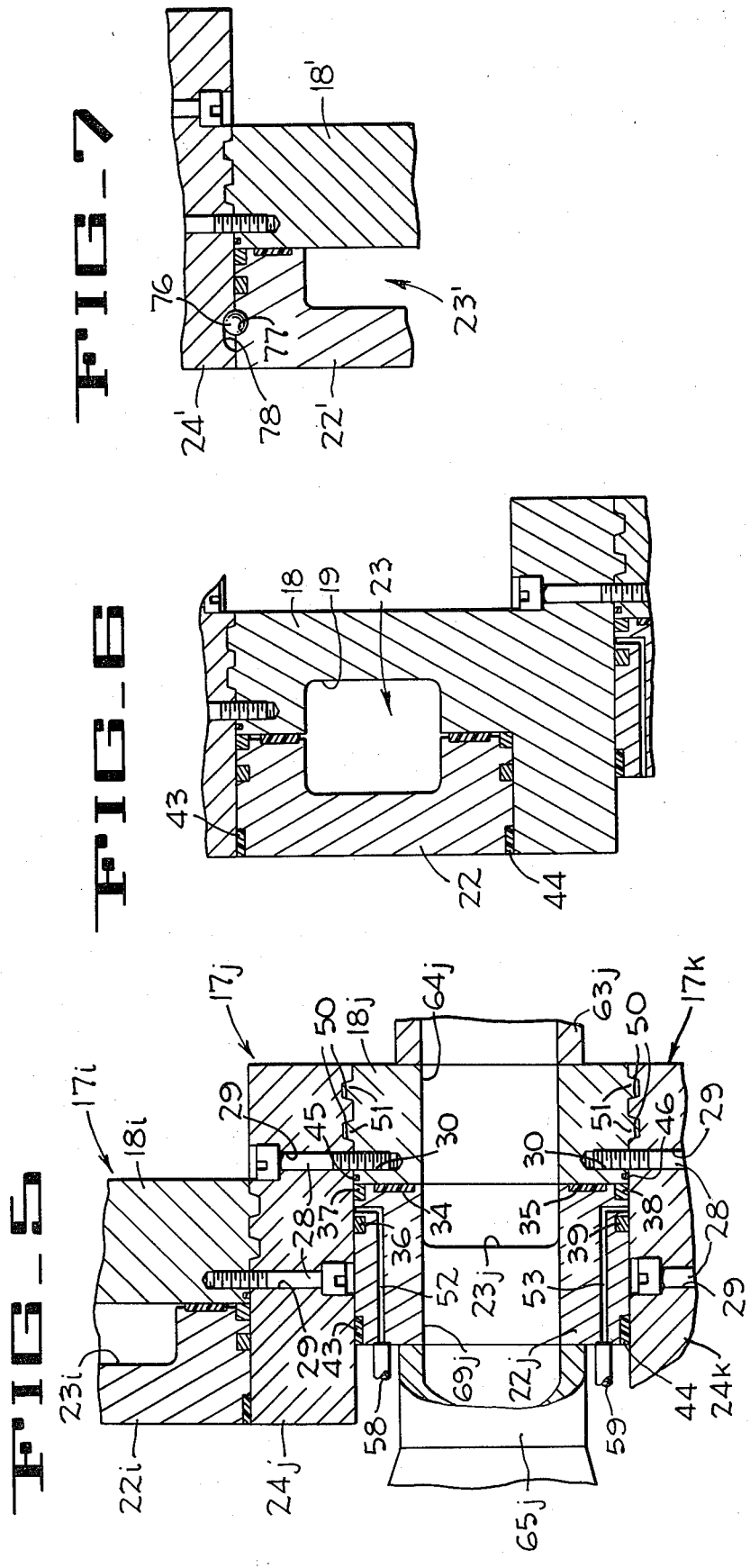

LARGE-DIAMETER MULTI-PASSAGE SWIVEL JOINT FOR HIGH PRESSURE SERVICE

BACKGROUND OF THE INVENTION

1. Field of the Invention

This invention relates to pipe swivel joints, and more particularly, to such swivel joints with multiple flow passageways for the simultaneous transfer of a plurality of separate fluids.

2. Description of the Prior Art

The production of oil and gas from offshore wells has developed into a major endeavor of the petroleum industry, and this growth has led to the development of various means for transporting petroleum and its products from offshore locations to shore-based refineries or storage facilities. Many of these wells are now being drilled and completed in deepwater where the use of marine tankers of very large capacity constitutes the most practical and efficient transport method.

One of the facilities which is employed in such a tanker operation is an offshore loading production ship or other floating terminal having a plurality of storage tanks for receiving and storing petroleum products from the deepwater wells. Shuttle tankers are used to receive the stored petroleum fluids and gas for transportation to the shore-based refineries. A production ship includes pipes or hoses extending from the ship to a floating buoy. A riser extends downward from the buoy to a riser base on the sea floor, and flowlines extend from the riser base to a plurality of production wells. The production ship is anchored in position about the riser, but the ship is free to revolve about the riser to head into winds and ocean currents to minimize the load acting on the mooring device. The riser may be coupled to several sources of gas and petroleum fluids that may be loaded simultaneously through a plurality of conduits all of which are connected to a single, multiple-conduit coaxial swivel joint on the floating buoy.

The multiple-conduit swivel joint has two or more annular chambers each communicating with an inlet and a corresponding outlet to provide two or more separate and distinct flow paths, and although such devices provide the desired function they are relatively complex and thus difficult and expensive both to manufacture and to disassemble for service. Some of the prior art multiple-conduit swivel joints include a plurality of stages of gradually decreasing diameter stacked one on top of the other in a stair step manner. Such an arrangement is satisfactory when only a few stages are needed, but cannot be used with a large number of stages as the diameter of the stages at the top and bottom of the joints become very small and very large respectively. Also such prior art swivel joints cannot be used for high pressure service due to failure of seals used between annular inner and outer joint members. Multiple-conduit swivel joints having a plurality of equal diameter stages are difficult to assemble and disassemble.

What is needed, therefore, is a large-diameter coaxial swivel joint that has a plurality of separate and distinct fluid flow passages between a plurality of inlets and a plurality of outlets, that is relatively uncomplex in design and thus inexpensive to manufacture and that is easy to assemble and disassemble for cleaning and maintenance. It is also important that such a swivel joint withstand higher pressures and contain more stages than the prior art joints.

SUMMARY OF THE INVENTION

The present invention comprises an improved pipe swivel joint for simultaneously transferring a plurality of separated fluid compositions from a plurality of inlet conduits to a plurality of outlet conduits. A swivel joint according to this invention includes a plurality of staggered-diameter stacked sections or stages which are readily removed for repair and service. Each of these stages includes an annular inner element having a radially extending inlet port therethrough, an annular outer element having a radially extending outlet port therethrough with said outer element rotatably surrounding said inner element. An upper seal plate may be connected on one end of the inner element and a lower seal plate may be connected to the other end. An annular fluid flow passage is defined by the outer surface of said inner element, the inner surface of the outer element and the adjoining surfaces of the seal plates. An outlet conduit is connected to the outlet port to rotatably connect the outlet conduit to the fluid flow passage. An inlet conduit is connected to the inlet port to connect the inlet conduit to the same fluid flow passage and means are provided for sealing the fluid flow passage at the junction of the inner and outer elements and the adjacent seal plates.

The stages can be readily stacked one on top of the other and connected by capscrews which extend through axial bores in the seal plate into threaded axial bores in the inner elements. The stages can be separated by removing the capscrews and lifting the upper section or sections from the lower sections. The stage diameters are staggered with large diameter stages alternating with smaller diameter stages to provide easy access to the capscrews which interconnect the adjacent stages. This staggering of stages in the swivel joint permits an almost unlimited number of stages to be stacked one on top of the other without the need for extremely large diameter or extremely small diameter stages.

The present invention uses face seals between the seal plates and the adjacent inner and outer elements to provide a fluid-tight seal which can withstand very high fluid pressures.

BRIEF DESCRIPTION OF THE DRAWINGS

FIG. 1 is an isometric drawing of a deepwater petroleum production system in which the multi-passage swivel joint of the present invention can be used.

FIG. 2 is a vertical section of a multi-passage swivel joint of the present invention taken along line 2—2 of FIG. 4.

FIG. 3 is an isometric drawing partly in section of the multi-passage swivel joint of FIG. 2.

FIG. 4 is a horizontal section of the pipe swivel joint taken along the line 4—4 of FIG. 2.

FIG. 5 is an enlarged portion of the drawing of FIG. 2, showing construction details of a typical stage of the swivel joint of the present invention.

FIG. 6 is a drawing similar to FIG. 5 showing construction details of a second embodiment of the present invention.

FIG. 7 is a drawing similar to FIG. 5 showing construction details of a third embodiment of the present invention.

DESCRIPTION OF THE PREFERRED EMBODIMENT

An offshore production system employing the multi-passage swivel joint illustrated in detail in FIGS. 2-5 is diagrammatically represented in FIG. 1. This system comprises a plurality of flowlines F, each extending between one of a plurality of subsea wells W and a riser base and manifold G positioned on the sea floor S, and a large diameter riser R extending vertically from riser base and manifold G to a subsurface buoy B below a surface buoy D. A first end of each of the small flowlines F is connected to one of a plurality of christmas trees C. The second end of each of the flowlines F is connected through the riser base G to a corresponding one of a plurality of conduits $11a-11k$ extending upward through the riser R to the subsurface buoy B mounted atop the riser R. A plurality of flexible hoses or flexible pipe $12a-12k$ (FIG. 1) are each connected between the upper end of a corresponding one of the conduit $11a-11k$ and a swivel joint 16 mounted on the surface buoy D.

The surface buoy D is secured in position above the subsurface buoy B by a plurality of cables J connected between the buoy D and the seafloor S by a plurality of anchors E. A plurality of hoses H1-H11 are connected between the swivel joint 16 and a production vessel V to carry gas and fluids from the swivel joint 16 to storage containers (not shown) on the vessel V. The vessel V is secured to the surface buoy D by a pair of arms K which allow the vessel to move about the buoy D according to the dictates of winds and tides.

The multi-passage swivel joint of the present invention (FIGS. 2 and 3) includes a plurality of stacked and staggered sections or stages $17a-17k$, although a greater or lesser number of stages can be stacked one on top of the other. The staggering of the diameters of the stages allows an exceptional large number of stages to be stacked in a single joint. As best seen in FIG. 2, the diameters of the individual stages alternate from small to larger to smaller etc. from top to bottom of the joint 16, so that diameters of the individual stages do not limit the number of stages that can be stacked. Also the staggering of the diameters of the stages facilitates the removal and replacement of stages for repair and service as will be shown hereinafter.

Each of the stages includes an annular inner member $18a-18k$ and an annular outer member $22a-22k$ rotatably surrounding and coaxial with the corresponding inner member $18a-18k$. An annular groove formed in the radially inward portion of the outer member provides a fluid flow passage $23a-23k$ between the inner surface of the outer element and the outer surface of the inner element. A plurality of annular seal plates $24a-24m$ are connected to the upper and lower ends of the inner members $18a-18k$ by a plurality of capscrews 28 each extending through a countersunk axial bore 29 in a seal plate $24a-24m$ into a threaded bore 30 in the inner members $18a-18k$ as shown in FIG. 5. Since the stages $17a-17k$ are similarly constructed and since details and labels of parts are shown in FIG. 5, not all parts are labelled in FIGS. 2-4.

Between each of the inner members $18a-18k$ (FIG. 2) and a corresponding outer member $22a-22k$ are a pair of radial bearings 34,35 best shown in FIG. 5. A plurality of sealing members 36,37,38,39 are mounted between each of the outer members $22a-22k$ and a corresponding seal plate $24a-24j$, and a pair of annular seals 45,46 are mounted between the inner members $18a-18k$ and the seal plates $24a-24j$ to prevent fluid from flowing out of the fluid flow passages $23a-23k$. Between each of the outer members $22a-22k$ and the adjacent seal plates $24a-24m$ are a pair of thrust bearings 43,44.

High pressure fluids in the annular fluid flow passages $23a-23k$ cause the annular inner members $18a-18k$ to decrease in diameter slightly and cause the annular outer members $22a-22k$ to increase in diameter slightly. When the stages $17a-17k$ are several feet in diameter, the change in diameter of the inner and outer members may approach one-eighth of an inch when the pressure in the fluid flow passage is 6000 psi. For this reason the use of annular radial seals between the inner and outer members, as in prior art low-pressure swivel joints, is not feasible. Therefore, face seals 36,37,38,39 are used between the outer members 22a, 22k and the seal plates $24a-24m$ and the annular seals 45,46 are mounted between each of the inner members $18a-18k$ and the adjacent seal plates $24a-24m$. The arrangement of the seals is best seen in the enlarged sectional drawing of FIG. 5.

The contraction of the inner members under high pressure could also cause the capscrews 28 to shear unless accompanied by the tongue and groove arrangement best shown in FIG. 5. A pair of annular grooves 50 are formed in the surfaces of the seal plates $24a-24m$ adjacent the inner members $18a-18k$ and a corresponding pair of projections or tongues 51 are formed in the adjacent inner members. The capscrews 28 provide tension which holds the tongues 51 in the grooves 50 and the shear forces between the inner member 18j (FIG. 5) and the adjacent seal plates 24j,24k are absorbed by the tongues 51 and grooves 50.

A pair of high pressure oil balance chambers 52,53 (FIG. 5) extend from the radially outer portion of the outer element 22j to a position between the sealing members 36,37 and 38,39 respectively. When high pressure fluid is introduced into the flow passage 23j oil under pressure can be coupled into chambers 52,53 from a pair of oil lines 57,58 to reduce the pressure differential acting on the sealing members 37,38.

Each of the hoses $12a-12k$ (FIGS. 1-4) is connected to a corresponding one of the annular fluid passages $23a-23k$ (FIGS. 2 and 3) by a connector $59a-59k$ and a pipe elbow $63a-63k$. This is best shown in stage 17j (FIGS. 2 and 5) where the upper end of the elbow 63j is welded or otherwise connected to the inner member 18j and the lower end of the elbow 63j is connected to the hose 12j by a connector 53j. The upper end of the elbow 63j communicates with the fluid flow passage 23j through a bore 64j in the inner member 18j. An outlet conduit 65j is welded or otherwise connected to the outer member 22j and communicates with the passage 23j through a bore 69j in the outer member 22j. The bores 64j and 69j are shown as being aligned in FIG. 2, but fluid can flow upward from the hose 12j and elbow 63j, through the bore 64j into the passage 23j and out the bore 69j irrespective of the rotational position of the outlet conduit 65j. The outlet conduit 65j includes a flange 70j having a plurality of holes 71 (FIG. 3) through which bolts can be placed to connect the outlet conduit to hoses H1-H11 (FIG. 1). Each of the connectors $59a-59k$ includes a plurality of notches 75 on the lower end which can be grasped and the connector unscrewed by a wrench (not shown) to disconnect the elbow $63a-63k$ from the corresponding hose $12a-12k$.

The swivel joint 16 can be mounted on a mounting base (not shown) such as the surface of the buoy D by bolting or welding the lower seal plate 24m to the mounting base or the swivel joint 16 can be connected to the buoy by bearing means (not shown) for pivotal movement about an axis A (FIGS. 2-4). The outlet conduits 65a-65k and the associated outer members 22a-22k can be individually rotated about the axis A to connect the outlet conduits to storage facilities placed in different locations about the joint 16.

The individual stages 17a-17k of the swivel joint 16 can be removed for service and/or repair by removing the appropriate capscrews 28. The removal of capscrews 28 and the unscrewing of the connector 59a from the hose 12a allows the upper stage 17a to be removed. Similarly the removal of capscrews 28 and the unscrewing of the connectors 59a-59d from the corresponding hoses 12a-12d allows the stages 17a-17d to be lifted off the remainder of the joint 16.

The embodiment of the swivel joint disclosed in FIG. 6 includes an inner member 18 having an annular groove 19 therein which forms a portion of the fluid passage 23. Although the embodiment of FIG. 6 shows an annular groove in both members 18 and 22, the groove could be omitted from outer member 22.

The embodiment of the swivel joint disclosed in FIG. 7 replaces the flat annular thrust bearing 43 (FIG. 5) with a plurality of ball bearings 76 (only one shown) in a bearing race formed by a semi-toroidal annular groove 77 in the outer member 22' and a wider annular groove 78 in the seal plate 24'. The wide groove 78 is needed because the outer member 22' expands radially outward, away from the inner member 18' when a high pressure fluid is in the passage 23'. The expansion of the outer member 22' causes the ball bearings 76 to move radially outward in the groove 78. The ball bearings shown in FIG. 7 reduces friction between the outer member 22' and the seal plate 24' and reduces the force required to rotate the outer member 22' about the inner member 18' and the seal plate 24'.

The present invention uses a plurality of staggered stacked stages to build a multi-passage swivel joint with a large number of separate fluid paths between the inlets and the outlets. The stages can be readily removed for service and repair. Face seals between an outer member and an adjacent seal plate and between the seal plates and an inner member allow extremely high pressure fluids to be moved through the swivel joint.

Although the best mode contemplated for carrying out the present invention has been herein shown and described, it will be apparent that modification and variation may be made without departing from what is regarded to be the subject matter of the invention.

What is claimed is:

1. A multi-passage swivel joint for simultaneous transfer of a plurality of separated fluids between a plurality of inlet conduits and a plurality of corresponding outlet conduits, said joint comprising:
   a plurality of annular inner members each having a radially extending inlet port therethrough;
   a plurality of annular outer members each having a radially extending outlet port therethrough, each of said outer members rotatably surrounding a corresponding one of said inner members;
   a plurality of annular flat seal plates;
   means for removably mounting each of said outer members between a pair of seal plates;
   means for removably connecting each of said inner members between a pair of seal plates;
   a plurality of annular fluid flow passages each defined by the outer surface of one of said inner members and the inner surface of a corresponding one of said outer members;
   means for sealing each of the fluid flow passages at the junction of said outer members and said seal plates;
   means for connecting each of said outlet conduits to a corresponding one of said outlet ports to rotatably connect each of said outlet conduits to a fluid flow passage;
   means for connecting each of said inlet conduits to a corresponding one of said inlet ports to connect each of said inlet conduits to a fluid flow passage; and
   means for sealing each of the fluid flow passages at the junction of each of said inner members and said seal plates.

2. A multi-passage joint as defined in claim 1 wherein each of said inner members, a corresponding one of said outer members and a pair of seal plates comprises a stage of said joint having a passage connected between an inlet conduit and an outlet conduit.

3. A multi-passage joint as defined in claim 2 wherein a plurality of said stages are removably stacked one on top of another.

4. A multi-passage joint as defined in claim 2 wherein said seal plates are each removably connected to at least one of said inner members.

5. A multi-passage joint as defined in claim 1 wherein a plurality of stacked joint stages are formed by removably connecting a plurality of said seal plates to a plurality of inner members in an alternating fashion to provide a seal plate adjacently above and another seal plate adjacently below each of said inner members.

6. A multi-passage joint as defined in claim 5 wherein a predetermined number of said stages can be removed from said joint by disconnecting one of said seal plates from an adjacent inner member.

7. A multi-passage joint as defined in claim 5 wherein said seal plates extend radially outward from said inner members to retain said outer elements about said inner members.

8. A multi-passage joint as defined in claim 5 wherein each of said seal plates is connected to each of the adjacent inner members by a plurality of mounting screws.

9. A multi-passage joint as defined in claim 8 wherein adjacent joint stages have staggered radial sizes to facilitate the removal of individual stages from the multi-passage joint by making the mounting screws readily accessible.

10. A multi-passage swivel joint as defined in claim 1 including a pair of sealing members at the junction of said outer member and said adjacent seal plate, a high pressure fluid balance chamber extending from a radially outer portion of said outer element to a position between said sealing members, and means for coupling fluid under pressure into said balance chamber to reduce the pressure differential acting on the sealing members.

11. A multi-passage multi-stage swivel joint for simultaneous transfer of a plurality of separated fluids between a plurality of inlet conduits and a plurality of corresponding outlet conduits, said joint comprising;
   a plurality of annular inner members each having a radially extending inlet port therethrough;
   a plurality of annular outer members each having a radially extending outlet port therethrough, each of said outer members rotatably surrounding a corresponding one of said inner members;

a plurality of annular seal plates;

means for removably connecting said seal plates to said inner members in an alternating fashion with an upper portion of each of said inner members connected to one of said seal plates and a lower portion of each of said inner members connected to another of said seal plates to form a plurality of stages, stacked one on top of another with a tongue and groove connection between each of said inner members and said adjacent seal plates;

a plurality of annular fluid flow passages each defined by the outer surface of one of said inner members and the inner surface of a corresponding one of said outer members;

means for connecting each of said outlet conduits to a corresponding one of said outlet ports to rotatably connect each of said outlet conduits to a separate fluid flow passage;

means for connecting each of said inlet conduits to a corresponding one of said inlet ports to connect each of said inlet conduits to a fluid flow passage; and means for sealing each of said fluid flow passages at the junction of said inner members and said outer members.

12. A joint as defined in claim 10 wherein a predetermined number of said stages can be removed from said joint by disconnecting a predetermined one of said seal plates from an adjacent inner member.

13. A joint as defined in claim 10 wherein a top one of said seal plates and a bottom one of said seal plates are each connected to a single one of said inner members and the remainder of said seal plates are each connected to a pair of adjacent inner members.

14. A multi-passage multi-stage swivel joint as defined in claim 10 wherein the stages are staggered in size with alternating larger and smaller diameter stages from the top to the bottom of said swivel joint.

15. A multi-passage multi-stage swivel joint as defined in claim 10 wherein said sealing means includes sealing members between each of said seal plates and an adjacent one of said outer members, and seals between each of said seal plates and an adjacent one of said inner members.

* * * * *